May 13, 1941.  M. J. WALL  2,241,563

METHOD FOR MELTING AND WELDING METALLIC SURFACES

Filed April 6, 1938

INVENTOR
MATTHEW J. WALL
BY
ATTORNEY

Patented May 13, 1941

2,241,563

UNITED STATES PATENT OFFICE 2,241,563

METHOD FOR MELTING AND WELDING METALLIC SURFACES

Matthew J. Wall, Jersey City, N. J., assignor to The Linde Air Products Company, a corporation of Ohio Application April 6, 1938, Serial No. 200,325

7 Claims. (Cl. 113—112)

This invention relates to the art of heat-treating metallic surfaces and has particular application to processes of altering the chemical and physical characteristics of metallic surfaces by heating these surfaces in the presence of an element or elements capable of alloying with the metal forming the surface.

While the invention is equally applicable to various heat-treating processes, such as fusion welding, mechanical pressure welding, case carburizing, and others, it will, for purposes of illustration, be more particularly described as applied to fusion welding.

At present, in fusion welding with an oxy-gas flame, a considerable degree of superheating above the melting point of the members to be welded is frequently practised in order to impart enough fluidity to the metal to float out particles of oxide produced, for, if these particles are trapped in the solidifying weld, they become objectionable, non-metallic discontinuities, weakening the weld. Superheating of the metal too much above the melting point causes an excessive absorption of gas with the subsequent evolution of this gas when the metal again cools to or below its freezing point. Since the top surface of the metal cools faster than the inside of the puddle, some of this gas is trapped, forming "blow-holes."

Furthermore, this superheating promotes oxidation of the deposited metal and the adjacent edges of the members to be welded as the flame advances and heats the base metal to a high temperature. The excessive heat tends to deplete the alloying constituents of the welding rod and reduce the carbon content an undesirable extent. This latter factor is objectionable because a depletion of these elements not only raises the melting point of the filler metal and narrows its freezing range but also reduces the strength and toughness of the filler metal. This factor is of considerable importance where high strength welds in high strength base metal are required.

When fusion welding with the oxy-gas flame, it is also desirable, where practicable, to so prepare the surfaces to be united that a V butt joint is formed between the members to be welded, with an opening provided at the bottom of the V. The hot gases of the flame are thus permitted to pass through this opening and thereby provide an efficient means for heating the bottom edges of the surfaces to be joined. For certain classes of joining, however, the V butt weld is not practicable and fillet welds must be employed, such as in the joining of structural members. In the latter case, it is not practicable to provide an opening for the hot gases to pass through and the welding flame is therefore deflected or divided so that it does not impinge on the bottom or root of the joint. This circumstance decreases the effectiveness of the welding flame and results in an increased consumption of gas and generally slower welding speed.

The above objectionable features of normal fusion welding with the oxy-gas flame heretofore have been overcome partially by introducing an excess of acetylene into the welding flame so as to render it reducing in character. However, a welding flame having present therein an excess of acetylene is at a correspondingly lower temperature than the so-called neutral flame in which substantially equal volumes of oxygen and acetylene are present. This reduction in flame temperature naturally lowers the speed of welding.

Heat transfer from an oxy-gas flame to a metal surface is a result of the movement of very hot gases at high velocities along the surface. To adequately heat the metal surface, large volumes of gas must be caused to flow thereover. In applying such a heating flame to the closed V root of a butt weld or to the corner of a fillet weld, it is very difficult to cause the hot gases to flow into the corner; rather, pockets of stationary gas are formed in the corners, and, as this dead gas has excellent insulating properties, heat transfer from the flame to the steel is hindered greatly. However, if a supplementary heat radiating body is placed in the hot part of the flame, radiant heat therefrom readily penetrates into the corners.

It also will be apparent from the above analysis of the state of the welding art, that some means for readily forming a reducing atmosphere adjacent the weld and at the same time lowering the necessary welding temperature would be of considerable value in increasing the speed, economy and quality of welding. This is true not only in fusion welding, but also in forming welds by mechanical pressure. In the latter instance, considerable economy can be effected if the temperature at which union between the adjacent edges of the metal to be welded takes place can be reduced, as less heating would be required and therefore the welding speed would be increased.

Furthermore, in such processes as case carburizing or other forms of metal treatment, in which a surface of a desired composition is to be formed on metal members, a rapid, economical process of altering the physical and chemical characteristics of the surface of the metal without the application of excessive heat thereto has long been desired.

It is therefore an important object of this invention to provide a method of working metal, wherein the temperature necessary for fusion or mechanical pressure welding is decreased, the speed of fusion and mechanical pressure welding is increased, oxidation of metallic surfaces being heat-treated is substantially prevented, desirable physical and chemical changes in the composition of the metallic surfaces are economically achieved, the heat of the welding flame heretofore wasted is conserved, the objectionable burning out of the ingredients of the metal being treated and of the filler metal prevented, and the strength and other desirable quantities of the base and filler metal are protected against impairment. Another object of the invention is to provide apparatus suitable for practising the above method.

These and other objects of the invention will in part be obvious and in part become apparent from the following description and the accompanying drawing, in which:

Fig. 1 diagrammatically illustrates one process of practising the invention, in which process a rod of carbonaceous material is positioned in contact with the inner cone of a welding flame;

Figure 5:
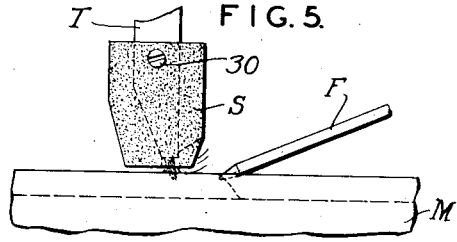
Figure 6:
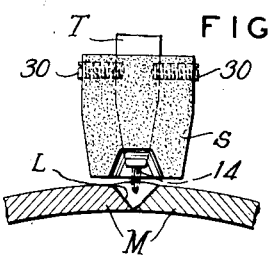

Fig. 5 diagrammatically illustrates another process of practising the invention, in which process the welding flame is surrounded by a skirt of carbonaceous material;

Fig. 6 is a view looking from the left of Fig. 5; and

Figure 7:
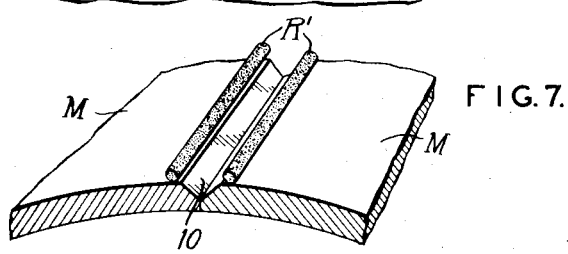

Fig. 7 diagrammatically illustrates still another process of practising the invention, in which process rods of carbonaceous material are laid alongside the welding groove.

Certain of the beneficial effects of the present invention depend upon the fact that the melting point of certain alloys is lower than that of any of the constituent metals of the alloys. For example, when carbon dissolves in solid iron, which it does rather rapidly at elevated temperatures, the melting point of the mixture falls below that of pure iron. The more carbon, up to about 4½%, the lower the melting point of the mixture. Pure iron melts at about 1530° C. while the 4½%, or eutectic mixture, melts at about 1150° C. If, therefore, steel containing say 0.35% carbon (structural steel), whose melting point is about 1500° C., is heated to a temperature somewhat below this, say to 1200° C., and then exposed to a carburizing influence, the surface layer of the white hot steel will absorb carbon and will spontaneously melt as soon as the carbon content approaches 4½%. The molten carburized film covering the surface of the steel prevents oxidation, promotes intimate contact by acting as a flux and causing the molten metal to run out over the solid metal and wet it, and acts as a temperature indicator, denoting by its formation and spontaneous melting the proper time to add the molten filler metal. Substantially the same effects appear when other metals are substituted for the carbon.

While the carbon or other elements may be introduced into the treating flame either in the form of finely divided powder or dust or in the form of a rod, the best results have been achieved when the element is used in the form of a rod.

In carrying out the principles of this invention as applied to fusion welding, the metallic members M to be united may be brought, in the usual manner, into the desired relation to each other so that a welded joint may be provided between adjacent surfaces thereof. Before being so positioned, the surfaces to be united may have been bevelled as indicated at 10 and otherwise conditioned for welding as required, and the blowpipe adjusted to give the desired flame characteristics. Ordinarily, a so-called neutral flame (one resulting from the passage of approximately equal parts by volume of oxygen and acetylene through the torch T) is employed, as this flame gives the highest flame temperature that can be obtained without producing an oxidizing effect upon the molten weld metal.

If now, a formed piece of carbon such as a carbon rod R is introduced into the flame, the rod becomes incandescent and wears down to a long pencil point whether it touches the steel or not. The surface of the rod itself reacts chemically with the gases surrounding it, but the greatest part of the chemical reaction takes place because small particles of carbon are abraded from the rod and permeate the outer flame envelope with their luminosity. Molecular carbon vapor may also be present.

Figure 1:
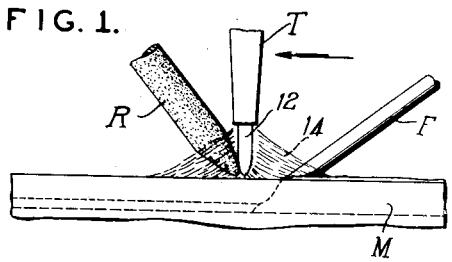

Preferably, and as shown in Fig. 1, the rod is positioned in contact with the tip of the inner cone 12 in the region known as the "hot spot" of the flame 14, so as to be heated largely by portions of the flame not directed upon the metallic surface being treated. In this manner the rod is heated to incandescence, thereby establishing a secondary "hot spot" giving off hot, incandescent, finely divided particles. These particles as well as the incandescent rod R constitute centers of heat radiation, and a part of this radiation is directed downwardly upon the weld metal and upon the sides of the seam ahead of the weld. The heat thus radiated by the rod and particles into the seam and onto the weld metal is additional to that which would ordinarily be communicated from the flame to the base and weld metal, since substantially all of the heat employed in raising the rod and particles to incandescence would otherwise have been wasted. This added heat, of course, tends to hasten fusion of the weld metal and sweating of the sides of the seam ahead of the weld.

Another result is that there is intimate contact and a large reaction surface between the oxidizing agents in the flame and the carbon, which converts the oxidizing agents quantitatively to reducing agents as the carbon introduced into the flame burns to carbon monoxide which tends strongly to reduce any oxides present on the surface of the metal. This results in clean metal and an oxide free surface. The effect is the same as that of a flux in promoting sweating of the steel V, since the heat available can act directly on the clean steel instead of on an insulating film of oxide. Furthermore, the reducing atmosphere protects the molten puddle from oxidation. Most important of all, the liquid steel film L (Fig. 6) formed by a physical solution of the carbon and the steel at the point of contact is at a lower melting point than that of the pure steel thereby greatly increasing the sweating action. The clean metal from the puddle easily fuses with the reduced fluid film which searches down into the root of the V insuring a clean weld and good penetration. As the flame advances, the molten steel film runs over the surface of the white hot steel which has thus been carburized and is immediately dissolved in the molten steel which thereupon unites with the underlying solid metal.

Figure 2:
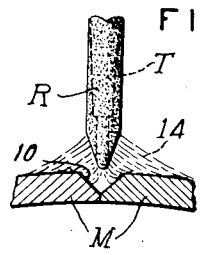
Fig. 2 is a view looking from the left of Fig. 1 and illustrating the deflection of the hot gases of the welding flame from the root of a welding groove.

Another method of carrying out the invention is to lower the carbon or other rod into contact with the sides of the base metal and drag its lower end along the groove ahead of the welding flame. This process still further hastens the sweating of the metal surface as additional carbon is added to the reaction by abrasion of the carbon in contact with the material being welded. When the carbon rod is dragged along the surfaces of the groove, heat is conducted from the rod to the base metal. Due to the closer proximity of the source of heat radiation to the base metal the radiation effect is increased. Projection of the rod into the groove promotes heat penetration into the root or bottom thereof insuring good weld penetration in this region. Inasmuch as penetration into the root or bottom of the V is insured by the dragging of the rod along the surfaces of the groove, it is not essential to leave a space between the bottom edges of the V to permit the escape of gases, which latter is necessary in normal fusion welding in order to insure thorough penetration of the flame throughout all the surfaces being welded. If, in normal fusion welding, no space is left at the root of the V, the flame gases are deflected, as shown in Fig. 2, and thorough penetration is not attained.

However, insertion of the carbon rod into the groove and dragging of the same along the groove is not desirable in performing hand welding operations. In the latter, it is essential that the carbon rod be held away from the members being welded, because in hand welding the amount of carbon deposited by abrasion cannot be accurately controlled and therefore too much carbon might be added to the weld with detrimental effects.

Figure 3:
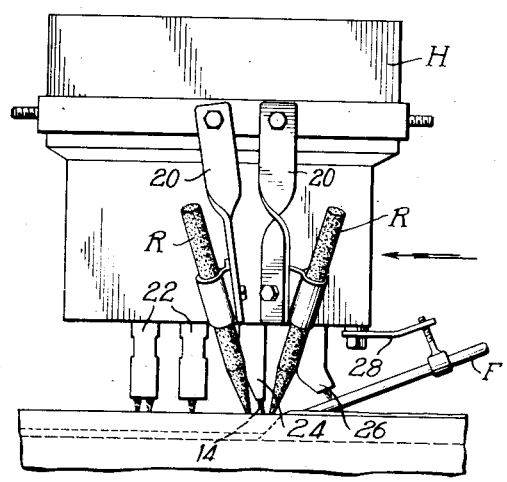
Fig. 3 illustrates a modification of the process shown in Fig. 1, utilizing a plurality of rods of carbonaceous material.
Figure 4:
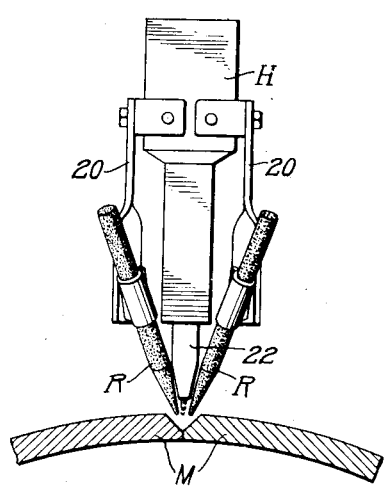
Fig. 4 is a view looking from the left of Fig. 3.

In the modification of this method illustrated in Figs. 3 and 4, a movable welding head H is employed, to which are secured supports 20 for a plurality of rods R of carbonaceous material. The welding head includes nozzles 22 for directing preheating flames on the work, a nozzle 24 for the welding flame 14 and a nozzle 26 by means of which a preheating flame may be directed on a rod of filler metal F supported in a holder 28 secured to head H. However, when a number of rods are used, careful control is necessary to prevent burning of the metal.

Still another method of carrying out the principles of this invention is to lay carbon rods R' along the sides of the seam and heat these rods to incandescence as illustrated in Fig. 7. The effects of this form of adding carbon to the weld are essentially the same as those of the two forms previously described.

A still further method is to surround and surmount the welding flame 14 with a carbonaceous block or skirt S, secured to a welding torch T by screws 30, as shown in Figs. 5 and 6. Improved results may also be obtained over prior art processes of heat treatment by introducing carbon dust into the flame or by painting the surfaces to be fused with a carbon paste containing a suitable flux. The embodiments of the invention illustrated in Figs. 5, 6, and 7 form the subject matter of my copending application Serial No. 368,583, filed December 5, 1940.

In these welding processes, since fusion of the sides of the groove takes place to a limited extent at the materially lowered temperature there is no need of superheating to burn out the oxide. Not only is the welding speed thereby increased but the grain size of the deposited metal and that of the base metal adjacent to the weld will be much smaller because the time during which the parts are subjected to high temperature is materially reduced and because the maximum temperatures reached by various portions of the base metal adjacent to the weld are also materially lowered. It might be emphasized here that the smaller the grain size, the more desirable are all the physical properties of the weld, other variables being constant.

A number of other beneficial results are obtained by these methods of introducing carbon into the treating flame, particularly in machine welding. For instance, as the carbon introduced into the flame burns to carbon monoxide which tends strongly to reduce any oxides present on the members being welded and thereby promotes sweating thereof, good penetration, good fusion between the base and filler metal and an increase in the welding speed are assured as it is unnecessary to meld down the sides of the V. The presence of the carbon rod prevents harmful oxidation and burning out of the carbon in the weld, thereby insuring strong welds. Also, waste heat from the flame is made partially useful by intense radiation from the incandescent carbon, thereby causing sweating in the oxide free V ahead of the puddle near the carbon. As the liquid steel film L formed by physical solution of the carbon rod and the steel at the point of contact is at a lower melting point than that of the pure steel, the sweating action is increased. Finally, the presence of many hot carbon particles in the flame probably increases all reaction rates by surface catalysis.

Various kinds of carbon rods may be employed in these processes, such as lamp black, graphite, petroleum coke, and the like. However, petroleum coke has been found to be best suited to the process and the best results have been obtained with all such rods by dragging them along in the groove in contact with the sides thereof in the manner described above. Very pure forms of lamp black and graphite rods have been tried to determine whether or not the 2% of sulphur contained in petroleum coke carbon causes red shortness and results in brittle welds. Results indicate that this is not a hazard in machine welding, since the best physical properties and speed were obtained with the petroleum coke carbon. For example, a maximum of 0.436 gram of carbon was consumed per foot of weld in one typical operation. 2% of this as sulphur in the weld is negligible even though it all entered the steel, which it does not do.

While the invention has been particularly described above as applied to fusion welding, it is, as previously stated, equally applicable to other processes, such as mechanical pressure welding, case carburizing, and other metal surface treating processes.

In applying the principles of the invention to mechanical pressure welding, the introduction of the carbon rod into the welding flame lowers the melting point of the surfaces being heated, as the carbon forms an alloy with these surfaces. The members to be welded may then be forced together sooner than when heated with the ordinary welding flame. Further beneficial effects arising from the use of the carbon rod are the provision of a reducing atmosphere and the reduction of the oxide film on the metal surfaces. Thus, not only is the speed of mechanical pressure welding increased, but the joint is of a better structure than that heretofore obtainable due to the lack of oxide on the surfaces being joined.

In case carburizing operations using the principles of the present invention, the heating flame may be directed upon the surface to be treated and a rod formed of the material to be alloyed with the surface, such as carbon, or other materials, may be either introduced into the flame above the surface to be treated or may be placed in contact with the surface. When using carbon in this manner, the carbon particles will unite with the metal surface being treated to form an alloy of iron and iron carbide which will melt at a considerably lower temperature than the pure metal. Thus the amount of heat which must be applied to the surface is considerably reduced, and by accurate manipulation, the required carbon content may be secured. The economy and speed of this process are obvious. Similarly, other materials may be used in the same manner and introduced in the heating flame to alloy with the surface being treated.

It should be understood that, in the process of fusion welding described above, suitable filler metal F may be used to supply the weld metal and may consist of the usual filler rod or wire. The filler metal may be fed into and melted into the groove in the usual manner simultaneously with the process of the invention. It is also to be understood that whereas the invention is herein set forth primarily in connection with welding, case carburizing and other surface treating operations, certain of the principles of the invention may be applied in cutting and similar heat-treatment of metals; and while carbon has been specifically mentioned, other metals may be used in the same manner.

Although several embodiments of the invention are disclosed in detail, it will be evident that numerous changes may be made in the details of the processes and apparatus disclosed without departing from the principles of the invention.

What is claimed is:

1. The process of melting a metallic surface which consists in directing a flame progressively against the surface to heat said surface to an elevated temperature less than the melting point of said surface and progressively moving a carbon rod in contact with the metallic surface while said rod is being heated by said flame to cause particles from said rod to form with said surface an alloy having a melting point lower than that of said surface and substantially equal to said elevated temperature, thereby causing spontaneous melting of said surface at said elevated temperature.

2. A process of melting a metallic surface which comprises the steps of directing against said surface a heating flame produced by the combustion of substantially equal volumes of oxygen and acetylene; positioning in said flame and adjacent such heated surface a rod of carbonaceous material, the inner end of said rod being disposed in the outer envelope of said flame closely adjacent the inner cone of the flame; and progressively moving said flame and said rod in unison along said surface, while heating the metal of said surface to an elevated temperature less than the normal melting temperature of said surface metal, and said rod to incandescence, to cause particles from said rod to form with such heated surface metal an alloy having a melting temperature substantially lower than that of said heated surface metal and substantially equal to said elevated temperature, whereupon such alloyed surface metal is melted by said flame at said elevated temperature.

3. A process of forming a mechanical pressure weld which comprises the steps of directing against the adjacent surfaces of the members to be welded a high temperature heating flame; positioning in said flame adjacent such heated surfaces a formed piece of carbonaceous material; heating the metal of said surfaces to an elevated temperature less than the normal melting temperature thereof, and said formed piece to incandescence, to cause particles from said formed piece to form with such heated surface metal an alloy having a melting temperature substantially lower than that of said surface metal and substantially equal to said elevated temperature, whereupon such alloyed metal of said surfaces will be rendered plastic by said flame at said elevated temperature; and thereupon forcing said members under pressure into contact to weld unite at said elevated temperature.

4. A process of fusion welding ferrous bodies together which comprises positioning the bodies so as to provide a groove between the adjacent surfaces to be weld united; directing into said groove and against the metal of said surfaces a high temperature heating flame; positioning carbonaceous means in said flame adjacent said surfaces and within said groove; heating the metal of said surfaces of said groove to an elevated temperature less than the melting temperature thereof, and said carbonaceous means to incandescence, to cause particles of said carbonaceous means to form with such heated surface metal an alloy having a lower melting temperature than that of said surface metal, whereupon such alloyed metal of said surfaces is melted by said flame at said elevated temperature; said carbonaceous means producing an atmosphere which has a reducing effect upon the heated metal of said surfaces or upon oxide impurities therein; and depositing molten filler metal within said groove to weld unite said bodies.

5. The process of weld uniting metallic members which consists in arranging said members with the surfaces to be united positioned to form a groove, directing a high temperature heating flame into said groove and against contiguous portions of said members adjacent said groove to heat said groove and said contiguous portions of said members to an elevated temperature less than the melting point thereof, positioning a formed body of carbonaceous material in said flame to form upon the unwelded portions of said members, a ferro-carbonaceous alloy having a melting point lower than the melting point of said members introducing a rod of filler metal into said flame, fusing said rod of filler metal by said flame and depositing said fused filler metal in said groove, progressively advancing said flame and said formed body and said rod of filler metal along said groove in unison; and heating said groove to an elevated temperature less than the melting point of said members but above the melting point of said ferro-carbonaceous alloy.

6. A process of melting a metallic surface which comprises the steps of directing against said surface a high temperature heating flame; positioning in said flame and adjacent such heated surface an element formed of non-fusible material capable of combining with the heated metal of said surface to form an alloy having a melting point substantially less than the normal melting point of such surface metal; and progressively moving said flame and said element in unison along said surface, while heating said element and successive portions of said surface by said flame to an elevated temperature greater than the melting temperature of said alloy but substantially less than the normal melting temperature of said surface metal, to cause particles from said element to combine with successive portions of the heated surface metal to form said alloy, whereupon such alloyed surface metal is melted by said flame at said elevated temperature.

7. A process as claimed in claim 6, in which said element is heated in incandescence and is so positioned in said flame as to form a secondary hot spot conserving heat units of the flame otherwise wasted and direct a substantial portion of such conserved heat units against said metallic surface.

MATTHEW J. WALL.